(12) United States Patent
Dietl

(10) Patent No.: US 12,415,464 B2
(45) Date of Patent: Sep. 16, 2025

(54) ROOF MODULE FOR FORMING A VEHICLE ROOF HAVING A ROTATABLE ENVIRONMENT SENSOR

(71) Applicant: Webasto SE, Stockdorf (DE)

(72) Inventor: Rudolf Dietl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 441 days.

(21) Appl. No.: 17/961,309

(22) Filed: Oct. 6, 2022

(65) Prior Publication Data

US 2023/0138179 A1    May 4, 2023

(30) Foreign Application Priority Data

Nov. 4, 2021 (DE) .................... 10 2021 128 742.1

(51) Int. Cl.
| | |
|---|---|
| B60R 11/04 | (2006.01) |
| B62D 25/06 | (2006.01) |
| B60R 11/00 | (2006.01) |
| G01S 13/931 | (2020.01) |

(52) U.S. Cl.
CPC ............. B60R 11/04 (2013.01); B62D 25/06 (2013.01); *B60R 2011/004* (2013.01); *B60R 2011/008* (2013.01); *G01S 2013/93273* (2020.01)

(58) Field of Classification Search
CPC ... B60R 11/04; B60R 2011/004; B62D 25/06; G01S 2013/93273
USPC ............................................... 296/190.1, 210
See application file for complete search history.

(56) References Cited

U.S. PATENT DOCUMENTS

| | | | |
|---|---|---|---|
| 2,918,566 A | 12/1959 | Lunsford | |
| 9,963,018 B2 * | 5/2018 | Williams | ............ B60R 13/0212 |
| 10,800,346 B2 * | 10/2020 | Taylor | ...................... B60J 10/90 |
| 11,731,705 B2 * | 8/2023 | Friedrich | ................ B60R 16/02 |
| | | | 296/210 |
| 11,919,487 B2 * | 3/2024 | Davidson | .................. B60S 1/52 |
| 12,153,164 B2 * | 11/2024 | Laverne | ................ G01S 17/931 |

(Continued)

FOREIGN PATENT DOCUMENTS

| | | |
|---|---|---|
| DE | 9411265 U1 | 11/1994 |
| DE | 102016008064 A1 | 12/2016 |

(Continued)

OTHER PUBLICATIONS

Office Action issued against corresponding German Application No. 10 2021 128 742.1; mailed Aug. 9, 2024;In German with English Machine Translation (8 pages).

*Primary Examiner* — Jason S Daniels
(74) *Attorney, Agent, or Firm* — Fitch, Even, Tabin & Flannery, LLP

(57) ABSTRACT

A roof module for forming a motor vehicle roof, the roof module having a panel component which may at least partially form a roof skin of the vehicle roof, which functions as an outer sealing surface of the roof module and which as at least one curved area. The roof module having at least one environment sensor which sends and/or receives electromagnetic signals for detecting a vehicle environment. The environment sensor is disposed in a circular opening of the curved area of the panel component and is displaceable, essentially without tilt, between a resting position and at least one operating position by means of a rotational movement around a rotation axis.

17 Claims, 5 Drawing Sheets

(56) References Cited

U.S. PATENT DOCUMENTS

2020/0232827 A1  7/2020  Neuhaeuser
2021/0237694 A1  8/2021  Hirschvogel et al.

FOREIGN PATENT DOCUMENTS

DE  10 2019 101 273 A1  7/2020
DE  102020102643 A1  8/2021

\* cited by examiner

ROOF MODULE FOR FORMING A VEHICLE ROOF HAVING A ROTATABLE ENVIRONMENT SENSOR

CROSS-REFERENCE TO RELATED APPLICATION

This application claims priority from German patent application no. 10 2021 128 742.1 filed on Nov. 4, 2021, which is hereby incorporated herein by reference in its entirety for all purposes.

FIELD

The invention relates to a roof module for forming a vehicle roof on a motor vehicle according to the preamble of claim 1.

BACKGROUND

Generic roof modules are commonly used in the field of vehicle construction as these roof modules can be prefabricated as separate function modules and delivered to the assembly line for the vehicle assembly. On its exterior surface, the roof module at least partially forms a roof skin of the vehicle roof which prevents moisture or air flow from permeating the vehicle interior. The roof skin is formed by one or several panel components which can be made of a stable material, for example, painted sheet metal or painted or thoroughly died plastic. The roof module can be part of a fixed vehicle roof or part of an openable roof module.

Furthermore, vehicle construction development increasingly focuses on autonomously or semi-autonomously driven motor vehicles. To enable the vehicle control system to control the motor vehicle autonomously or semi-autonomously, a plurality of environment sensors (for example, lidar sensors, radar sensors, (multi) camera sensors etc. including further (electrical) components) are used which are, for example, integrated in the roof module, detect the environment around the motor vehicle and, for example, determine a respective traffic situation from the detected environment data.

Roof modules provided with a plurality of environment sensors are also known as roof sensor modules (RSM). The known environment sensors send and/or receive corresponding electromagnetic signals, for example, laser beams or radar beams, a data model being generated by means of a corresponding signal evaluation and used for controlling the vehicle.

Most commonly, the environment sensors for monitoring and detecting the vehicle environment are attached to the vehicle roof, as the vehicle roof is usually the highest point of a vehicle from which the vehicle environment is highly visible. Most commonly, the environment sensors are formed as an attachment of the respective vehicle roof. This results in an optical appearance that usually does not meet customer requirements. Additionally, there is a risk that, even when the environment sensor is not in use because of environmental and weather influences, a see-through portion, through which the environment sensor detects the vehicle environment, becomes polluted or non-transparent for the environment sensor or even damaged (for example, because of hail).

For this reason, the environment sensor is preferably displaceable to satisfy aesthetical requirements, for example, and to additionally protect the environment sensor from environmental influences when it is inactive. Different vehicle types and design requirements bring about the problem that there is only limited assembly space available for a required movement mechanism because of the remaining requirements for the roof module (for example, providing a sliding or panoramic roof) and that this limited assembly space is most commonly limited to an outer edge portion of the roof module. The small assembly space often requires a corresponding mechanism to provide a complex movement sequence for retracting and extending the environment sensor and thus, to be realized in a technically complex manner. This also results in extra effort and expense for the assembly. Thus, depending on assembly space requirements, it is desirable to provide a suitable movement mechanism with minimum space requirements.

SUMMARY

Therefore, the object of the invention is to propose a roof module which fulfills the requirements described above and which provides in particular a displaceability of an environment sensor while keeping the assembly volume as small as possible.

This object is attained by a roof module according to the teachings of claim 1.

Advantageous embodiments of the invention are the subject matter of the dependent claims.

The roof module according to the invention for forming a vehicle roof on a motor vehicle comprises a panel component which at least partially forms a roof skin of the vehicle roof, which functions as an outer sealing surface of the roof module and which has at least one curved area. The roof module further comprises at least one environment sensor which can send and/or receive electromagnetic signals around an optical axis of the environment sensor for detecting a vehicle environment. The roof module according to the invention is characterized in that the environment sensor is disposed in a circular opening of the curved area of the panel component and is displaceable, essentially without tilt, between a resting position and at least one operating position by means of an (in particular purely) rotational movement around a rotation axis. Particularly preferably, the environment sensor can be displaceable, essentially without tilt, between the resting position and at least the operating position by means of the rotational movement around the rotation axis. The rotational movement is preferably provided by a rotating mechanism which can preferably be disposed inside the roof module.

The solution according to the invention is advantageous in that the environment sensor can be displaced by a purely rotational movement between the resting position, in which the environment sensor is in an inactive mode, and at least the operating position, in which the environment sensor is in an active mode, in which it detects the vehicle environment around the optical axis. Thus, no complex mechanism is required to retract and extend the environment sensor, for example, from the panel component. Instead, the rotational movement around the rotation axis according to the invention can be provided by a simple drive, for example, in the form of an electric actuator. In general, the rotation axis can have any direction towards a surface of the panel component. Preferably, the environment sensor is rotatably disposed in the opening such that it can rotate by at least 180° with respect to the rotation axis. Generally, it is also possible that the environment sensor is rotatable around the rotation axis by more than 180° (for example, 190°, 200°, 210°, 220°, 230°, 240°, 250°, 260°, 270°, 280°, 290°, 300°, 310°, 320°, 320°, 330°, 340°, 350°, 360°). The solution according to the invention is in particular advantageous because a rotating mechanism of the environment sensor requires a small assembly space in the roof module. Additionally, because of the simplicity of the mechanical (rotating) movement, standardized components are generally sufficient, such that a rotating mechanism of this kind can be provided particularly cost-efficiently. According to the invention, it is also possible to implement a plurality of functions in the rotating mechanism in a simple manner. Another advantage, in particular in comparison with other displacement mechanisms (working with lifting and/or tilting movements), is that, viewed in a vertical direction z of the vehicle, the environment sensor requires very little assembly space because for displacing the environment sensor, only a rotational movement around its own rotation axis is required. Another advantage of the solution according to the invention is that it is easily possible to connect the at least one environment sensor and, if applicable, other components to a cable harness, because a cable routing simply has to accommodate the rotational movement of the environment sensor around the rotation axis. Preferably, such a cable routing can be placed in an area around the rotation axis.

For example, the environment sensor can be disposed on a bearing pin or the like on a frame of the roof module (or be non-rotatably connected to the bearing pin) by means of a housing or the like. For example, the bearing pin can be directly or indirectly connected to a drive. Via the rotation of the bearing pin by means of the drive, the environment sensor can be rotated around the rotation axis. The rotation axis of the bearing pin corresponds to the rotation axis of the environment sensor.

"At least one" means that the roof module can comprise one or several of the respective components and that the respective components can generally have any position on the roof module. Generally, the environment sensor can be displaced not only between the resting position and the operating position but also take a plurality of additional operating positions.

In the present case, "circular opening" means any type of opening which comprises an essentially circular shape or an essentially circular opening cross section. This wording in particular serves the purpose creating distance from a rectangular opening.

"Without tilt" means that the environment sensor can be displaced between the resting position and at least the operating position by means of a preferably purely rotational movement, without requiring a tilt and/or a pivoting motion of the environment sensor. "Essentially without tilt" means that the environment sensor does not tilt when displacing the environment sensor between the resting position and at least the operating position, apart from a tilting around the rotation axis caused by play, for example, which results from disposing the environment sensor with play, for example.

"Curved area" means at least one area of the panel component which has a three-dimensional expansion and which commonly has an essentially convex outer appearance. The panel component is formed preferably as a kind of convex shell component in the curved or bent area and preferably has a three-dimensional geometry which follows a three-dimensional, steady surface contour. Preferably, the curved area has a main curvature, on which, from a mathematical point of view, the surface contour has a type of high point. In other words, the curved area preferably means a protrusion or a type of curvature of the panel component or the roof skin, by means of which the preferably aerodynamic vehicle contour is formed. The curved area is preferably provided in a front part (viewed in a direction of travel) of the roof module and defines an (in particular smooth) transition between a windshield of the motor vehicle and the roof module via a preferably steady curve. Generally, the curved area can also be disposed in a rear area of the roof module and, for example, form a rear spoiler or the like and/or an (in particular smooth) transition between the roof module and a rear window of the motor vehicle. Generally, the curved area can also be provided in a center area of the roof module and/or in a lateral area (viewed in the direction of travel), depending on the roof module and motor vehicle type (for example, SUV).

The roof module according to the invention can form a modular unit in which devices for autonomous or semi-autonomous driving supported by driving assistance systems are integrated and which can be fitted on a vehicle shell structure as a unit by a vehicle manufacturer. Furthermore, the roof module according to the invention can be formed as an entirely fixed roof element or also as a roof having a roof opening system. Additionally, the roof module can be used for passenger cars or commercial vehicles. Preferably, the roof module can be provided as a modular unit in the form of a roof sensor module (RSM) in which the environment sensors are provided in order to be used as a supplyable modular unit in a roof frame of a vehicle body.

In general, the environment sensor according to the invention can have various designs and comprise in particular a lidar sensor, a radar sensor, an optical sensor, such as a camera and/or the like. Lidar sensors operate in a wavelength range of 905 nm or even approximately 1.550 nm, for example. For the wavelength range used by the environment sensor, the material of the roof skin or another component in a see-through portion, through which the environment sensor looks during the detection of the vehicle environment, should be transparent and the material should thus be chosen in accordance with the wavelength(s) used by the environment sensor. A field of view of the environment sensor, in which it detects the vehicle environment, preferably extends symmetrically around the optical axis of the environment sensor in the shape of a cone having a sensor-specific cone opening angle. It is obvious that the environment sensor can also be part of a sensor module which is comprised in the roof module and which can comprise the environment sensor and additional electrical components and/or mechanical components (for example, a housing, parts of a housing and/or a drive and other components).

In a preferred embodiment, the environment sensor is configured to send and/or receive electromagnetic signals for detecting the vehicle environment around its optical axis in the operating position. In the operating position, the environment sensor is preferably also in an active mode, in which the vehicle environment can be detected. Positioning the environment sensor in the at least one operating position is preferably effected by a corresponding rotation of the environment sensor around the rotation axis (for example, a rotation angle of 180°, measured relative to the resting position). In the resting position, a lid piece of a sensor module, in which the environment sensor is comprised, is preferably disposed in the opening such that it closes the opening in an essentially flush manner. In the resting position, the environment sensor particularly preferably detects no electromagnetic signals and is thus preferably in an inactive mode. Positioning the environment sensor in the resting position is preferably effected by a corresponding rotation of the environment sensor around the rotation axis (for example, a rotation angle of 0°, measured relative to the resting position).

In a preferred embodiment, a see-through portion of the environment sensor protrudes over at least an edge of the circular opening in the at least one operating position. Because of the curved area of the panel component, the shape of the edge of the circular opening is not fully parallel to a horizontal line but runs at an angle to such a horizontal line. In other words, the circular opening is inclined relative to a horizontal plane, as this corresponds to an imagined shape (i.e., a fictitious shape of the curved area if there was no opening) of the curved area of the panel component. In the at least one operating position, the see-through portion of the environment sensor preferably looks over at least an edge portion of the edge of the opening which is disposed at the deepest point relative to the rest of the edge of the opening, viewed in the vertical direction of the vehicle. Thus, the environment sensor can detect the vehicle environment through the see-through portion as undisturbedly as possible from the surrounding panel component. Thus, at least the see-through portion protrudes over the edge and thus also over the panel component in the at least one operating position. However, further components (such as an electronic system and/or a processing unit) of the at least one environment sensor can still be disposed below the roof skin.

In a preferred embodiment, the circular opening has an at least essentially oval, preferably elliptical shape. The term "oval" (from Latin ovum "egg") means a closed curve in a plane which resembles the outline of an egg. It comprises circles and ellipses as special cases, with any arbitrary oval not requiring an axis of symmetry, contrary to these special cases. Particularly preferably, the circular opening is essentially elliptical. An ellipse describes a geometrical shape characterized by a sum of distances of any ellipse point on the ellipse of two predetermined points, the focal points, which is the same for all ellipse points. "Essentially elliptical" means that the shape of the opening is mainly that of an ellipse, but, depending on the type and design of the roof module, can also comprise edge contours deviating from the elliptical shape. By means of a suitable geometrical design of a preferred cover of the environment sensor, the essentially elliptical shape of the opening in interaction with the curved area of the panel component allows closing the opening in the resting position, preferably so as to line up flush. This results in particular from a fictitious projection of the elliptical opening onto a plane which is orthogonal to the rotation axis of the environment sensor corresponding to a circular surface. This, in turn, is explained by the fact that the elliptical opening runs towards such a plane at an angle and thus, the two focal points of the ellipse coincide during the projection onto such a plane, such that it results in a common center which is located on the rotation axis of the environment sensor. This geometrical principle allows a complex surface section to be provided as a cover of the environmental sensor which allows the opening to be sealed in a flush manner relative to the curved area of the panel component simply by means of a mechanically simple rotational movement of the environment sensor.

In a preferred embodiment, the lid piece has at least an essentially oval, preferably elliptical shape, by means of which the opening is closeable so as to fit essentially perfectly in the closed position. Thus, the lid piece is formed in the manner of a complex surface section through which the opening is closeable so as to essentially align flush relative to the roof skin. "Essentially align flush" means that the opening is closeable by means of the lid piece so as to fit essentially perfectly or align flush in compliance with function-related tolerances, which are also present in the case of a preferred seal between the lid piece and panel component, when the environment sensor is in the resting position. Preferably, the lid piece has a curved shape which corresponds to a shape of the surrounding curved area. Particularly preferably, the lid piece comprises a shape of a surface section of the panel component, the surface section having to be at least fictitiously cut out from the opening for providing the opening. Particularly preferably, the lid piece has a curved shape and extends so as to essentially align flush (thus, in a mathematical terms, steadily) relative to the curved area of the panel component.

In a preferred embodiment, the environment sensor comprises an essentially cylindrical housing portion, in particular a housing portion in the shape of a part of a cylinder, which is rotatably disposed in the preferably essentially elliptical opening. In other words, at least one part of the environment sensor is formed as a cylindrical housing having a cylindrical lateral surface, said housing being able to rotate in the opening. Particularly preferably, the cylindrical lateral surface serves as a counter-sealing surface for an edge of the opening, such that a weatherstrip can be provided between the opening and the environment sensor. On the surface, the cylindrical housing portion preferably lines up with the lid piece. In a particularly preferred embodiment, the cylindrical wall of the housing portion can be formed in the manner of a hollow cylinder. Particularly preferably, the see-through portion is disposed at least in sections in the wall of the housing portion.

The housing portion preferably has the shape of a cylinder section. A cylinder section is a circular cylinder cut off at an angle. Alternatively, the housing portion can also have the shape of a cylindrical wedge (which is yielded from a cut running through the base (area) of a cylinder). In mathematical terms, this means that when a cylinder is cut off at an angle, it results in a body having an ellipse as a top surface. This body (in this case, the housing portion) is then determined by heights h1 and h2 and by a base radius r. Simplified in two-dimensional demonstration, the askew ellipse as the top surface has the two half-axes 2r and root $(4r^2+(h2-h1)^2)$. If the top surface is curved, the top surface has a more complex geometry. According to the invention, the top surface is preferably formed by the preferably curved lid piece of the housing portion by means of which the opening can be closed so as to essentially align flush. The fictitious projection of the elliptical opening onto a plane (which, in the present case, corresponds to an imagined base circular surface of the housing portion in the shape of a part of a cylinder) results in a circular surface having the base radius r. The rotation axis of the environment sensor corresponds to a main cylindrical axis and runs through the center of the base circular surface of the housing portion. In other words, the rotation axis is concentrically aligned to a central axis of the cylindrical housing portion.

In a preferred embodiment, the rotational movement is essentially carried out without leverage force. In this case, "essentially without leverage force" means that, in the proper sense, no leverage force is required for the rotational movement of the environment sensor, so the environment sensor is not, for example, rotatably flange-mounted on a roof frame of the roof module via a lever arm. Instead, the rotational movement of the environment sensor is effected directly around the rotation axis, a center of gravity of the environment sensor preferably being on the rotation axis. However, a drive, which is preferably used for the rotational movement of the environment sensor, can certainly create a leverage force in one or several drive components. This embodiment in particular serves the purpose of differentiating from adjustment mechanisms in which the environment sensor is attached on a roof frame of the roof module via a rotating lever and a center of gravity of the environment sensor is distanced from the actual rotation axis.

In a preferred embodiment, the displacement of the environment sensor is carried out without lifting force. The displacement of the environment sensor between the resting position and at least the one operating position is thus preferably effected without a lifting of the environment sensor (and thus without lifting force).

In a preferred embodiment, the environment sensor is preferably connected to at least one drive, preferably via a gear, the drive being configured to displace the environment sensor around the rotation axis between the resting position and at least the operating position. In this case, the environment sensor can be directly connected to the drive, meaning via a direct connection. The environment sensor can also be indirectly connected to the drive, i.e., for example, via a single-stage or multi-stage gear, via a Bowden cable, via a flexible shaft or via any other lever linkage. The drive is preferably an electric actuator. Other types of drives, for example, hydraulic or pneumatic drives, can generally also be used. If a Bowden cable is used, for example, it can be preferred if the environment sensor is prestressed by means of a spring, for example, a leg spring, in the resting position or the at least one operating position. Thus, the Bowden cable can rotate the environment sensor against the spring force into the correspondingly different position by means of the drive, whereas rotating back to the starting position is effected by releasing the Bowden cable and thus by the spring force. Generally, it is also possible to displace several environment sensors by means of one shared drive. For example, two flexible shafts can be disposed on a drive in the opposite direction, such that two environment sensors (for example, viewed in the moving direction, on the right and left in corner areas of the roof module) are displaceable by means of a rotation of the drive.

In a preferred embodiment, a weatherstrip is disposed circumferentially (i.e., preferably without interruptions) around the opening by means of which a seal is provided between the environment sensor and the roof skin, irrespective of the position of the environment sensor. Particularly preferably, the weatherstrip is disposed on an edge of the opening and abuts against the cylindrical housing portion, preferably on the cylindrical lateral surface, by means of at least one sealing lip. The purely rotational movement of the environment sensor according to the invention allows the environment sensor to be sealed in a simple manner relative to the panel component. For example, the lateral surface of the housing portion can thus be constantly, i.e., irrespective of the position of the environment sensor, in connection with the weatherstrip or the at least one sealing lip, such that a seal is provided in any position of the environment sensor. The weatherstrip is preferably a tubular seal which is used versatilely in the automotive sector. Standard components can also be used in this case, which allows the solution according to the invention to be designed particularly easily and cost-effectively. In particular compared to other displacement mechanisms which, for example, comprise a lifting movement of the environment sensor, the seal according to the invention is very simple because no primary and secondary weatherstrips are required, only one single main weatherstrip. Alternatively, the weatherstrip can also interact with the housing portion in the shape of a part of a cylinder only in sections, for example, only in the resting position, so as to be liquid-tight, whereas, for example, in the at least one operating position, an additional seal can also be provided between the opening and the inside of the roof module, the seal not abutting against the housing portion, but merely preventing water from permeating the inside of the roof module.

Generally, it is advantageous for the roof module according to the invention if the see-through portion can be cleaned by a cleaning device having at least one cleaning nozzle. The cleaning device is preferably comprised by the roof module. Preferably, the cleaning device can be provided on an inside of the roof module and thus clean the see-through portion in the resting position on the inside of the roof module, for example.

This can be advantageous because the cleaning is not subject to external influences, in this case, and can possibly be carried out more effectively. It is merely necessary that the cleaning is effected in a wet area of the roof module which is separated in a liquid-tight manner from a dry area, in which the environment sensor and other electronic components, if applicable, are disposed. Such a wet area can also be provided on the inside of the roof module, for example, a fluid in this case preferably being dischargeable via at least one outlet from the roof module. Alternatively or additionally, the cleaning device can also be disposed on the surface of the roof skin and be configured to clean the see-through portion of the environment sensor, preferably in at least one of the operating positions.

In another preferred embodiment, the essentially cylindrical housing portion is configured to perform a relative movement relative to the weatherstrip during a rotation in the opening by means of which the essentially cylindrical housing portion receives a mechanical cleaning. In other words, the cylindrical housing portion of the environment sensor additionally or incidentally receives a mechanical cleaning by one or several rotation cycles via a movement of the essentially cylindrical housing portion relative to the weatherstrip. Thus, the cleaning function is preferably supplemented by a see-through portion (which can be formed preferably as a cylindrical, in particular transparent, lateral surface of a sensor housing) relative to a weatherstrip which at least partly circulates the opening (for example, a collar seal) receiving a relative movement or lifting movement, for example, via a rotation (preferably back and forth) of the environment sensor (or the sensor unit) from the resting position to the at least one operating position. During the rotation, the see-through portion is preferably swept past the weatherstrip. Preferably, this allows dirt particles or the like to be wiped off. The weatherstrip, which can preferably be disposed on an edge of the opening, thus preferably assumes the function of a windshield wiper. A cleaning function can thus preferably also be supported by several rotation cycles of the environment sensor around its axis of rotation. Likewise, a weatherstrip profile optimized for this function, which includes at least one wiper lip, for example, supports the cleaning of the see-through portion.

In general, any type of environment sensor can be installed in the roof module. Particularly preferably, lidar sensors and/or radar sensors and/or camera sensors and/or multi-camera sensors are used for the roof module according to the invention.

Furthermore, the invention relates to a motor vehicle comprising a roof module according to the invention and its embodiments. The environment sensor can be disposed along a roof frame of the roof module and/or a roof frame of the vehicle body.

It is obvious that the embodiments and the illustrative examples described above and yet to be explained below can be formed not only individually but also in any combination without departing from the scope of the present invention. Additionally, any and all embodiments of the roof module refer to a motor vehicle comprising such a roof module.

An embodiment of the invention is schematically illustrated in the drawing and is described in an exemplary manner hereinafter.

BRIEF DESCRIPTIONS OF THE DRAWINGS

DETAILED DESCRIPTION

Figure 1:
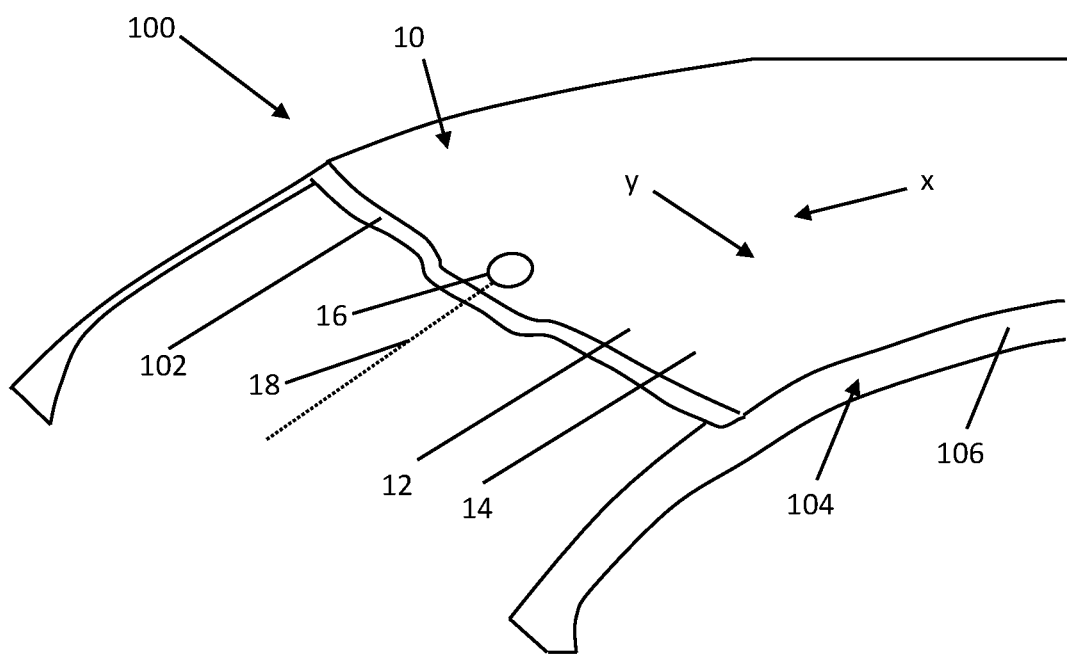
FIG. 1 is a perspective view of a vehicle roof having roof module according to the invention.

In FIG. 1, a vehicle roof 100 of a vehicle which comprises a roof module 10 according to the invention is illustrated. Roof module 10 comprises a panel component 12 for forming roof skin 14 of vehicle roof 100 of the vehicle (not fully shown). In a front face central roof area of vehicle roof 100 or roof module 10, viewed in a longitudinal direction x of the vehicle, an environment sensor 16 (in this case a lidar sensor) is disposed which can detect an environment of the vehicle around an optical axis in the form of electromagnetic signals. Other types of sensors, for example, (multidirectional) cameras can also be used. In the present case, environment sensor 16 is disposed directly behind a front transverse rail 102 which defines a roof header of the vehicle. Preferably as a modular unit, roof module 10 is accommodated in a roof frame 104 of the vehicle or fitted on at least two transverse rails 102 and at least two longitudinal rails 106, which forms roof frame 104.

According to the invention, environment sensor 16 is disposed in an essentially elliptical opening 20 (see FIGS. 2 and 3) in a curved area 22 of panel component 12. According to the invention, environment sensor 16 is configured to be displaced without tilt between a resting position (see FIG. 2) and at least one operating position (see FIG. 3) by means of a rotational movement around a rotation axis 24.

Figure 8:
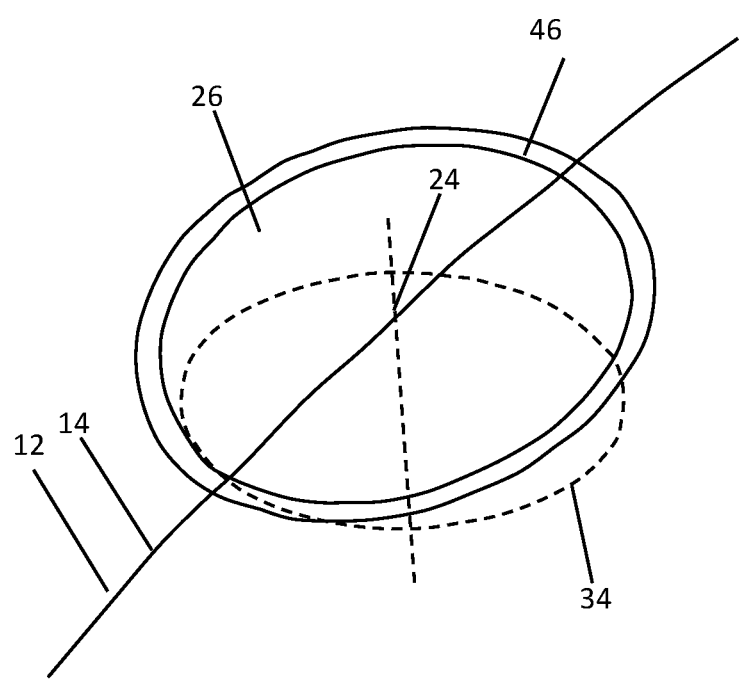
FIG. 8 is an embodiment of an environment sensor in a resting position.

In the operating position, environment sensor 16 is configured to send and/or receive electromagnetic signals to detect the vehicle environment around its optical axis 18 in this manner. By contrast, in the resting position, environment sensor 16 is disposed such in opening 20 that it closes opening 20 in an essentially flush manner (see FIGS. 2 and 8). For closing the opening, environment sensor 16 has a lid piece 26 whose shape essentially correspondents to the shape of opening 20 in order to close said opening 20 as precisely as possible. To this end, lid piece 26 has an essentially elliptical and curved shape whose curved part extends in an essentially flush manner to curved area 22 of panel component 12 (see FIGS. 4 and 8). In the at least one operating position, a see-through portion 28 of environment sensor 16 protrudes over at least one edge 30 of circular opening 20 (see FIG. 3), so that environment sensor 16 can detect the vehicle environment in this position. Edge 30 circulates opening 20. See-through portion 28 is made of a material transparent for environment sensor 16, for example, glass or a synthetic material (for example, polycarbonate).

Figure 4:
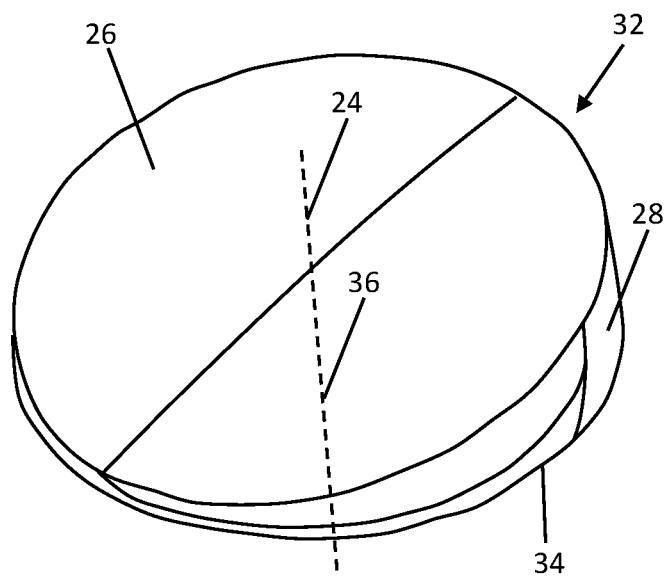
FIG. 4 is an embodiment of an environment sensor having a lid piece.

In the present case, lid piece 26 is disposed on an essentially cylindrical housing portion 32, which essentially has the shape of a cylindrical wedge in the embodiments shown (see FIG. 4). This shape of housing portion 32 is yielded if a fictitious cylinder is cut almost directly at its circular base area 34 at an angle to the base area. Housing portion 32 thus has a cylindrical part comprising a prespecified radius which is essentially the same as a radius of a fictitious circular projection (which essentially corresponds to base area 34) of essentially elliptical opening 20. A central axis 36 of housing portion 32 which essentially has the shape of a part of a cylinder is the same as rotation axis 24 (see FIG. 4).

Figure 2:
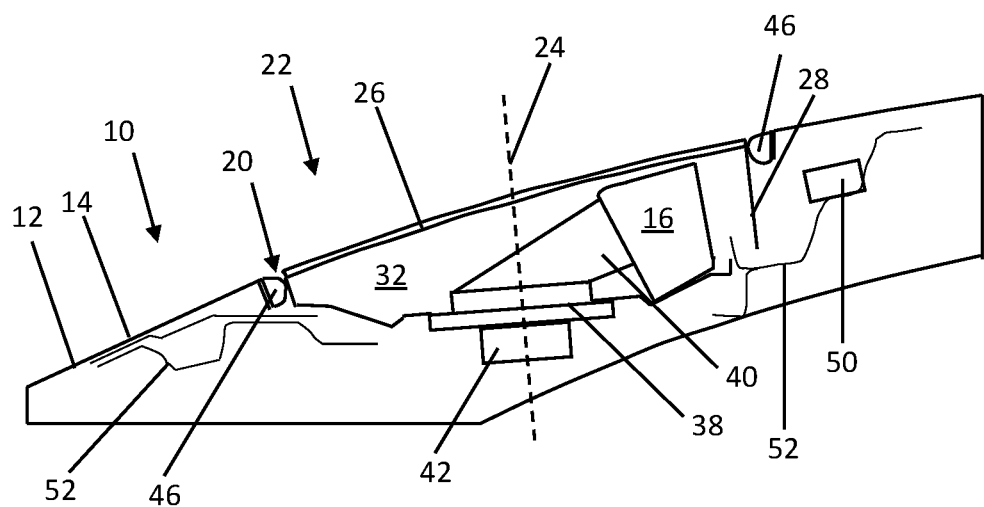
FIG. 2 is a first embodiment of the roof module according to the invention having at least one displaceable environment sensor.
Figure 3:
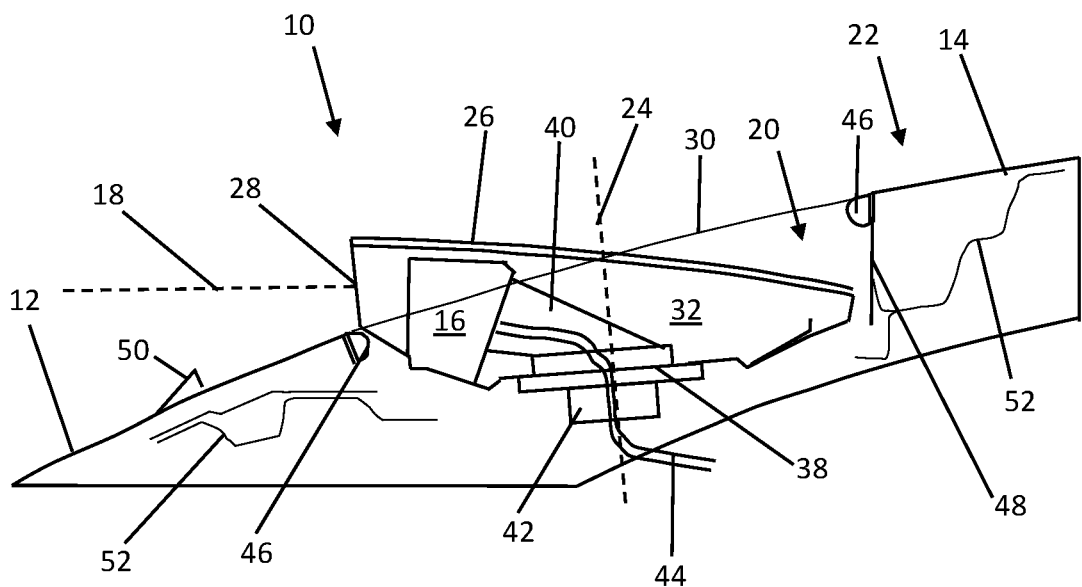
FIG. 3 is a second embodiment of the roof module according to the invention having at least one displaceable environment sensor.
Figure 5:
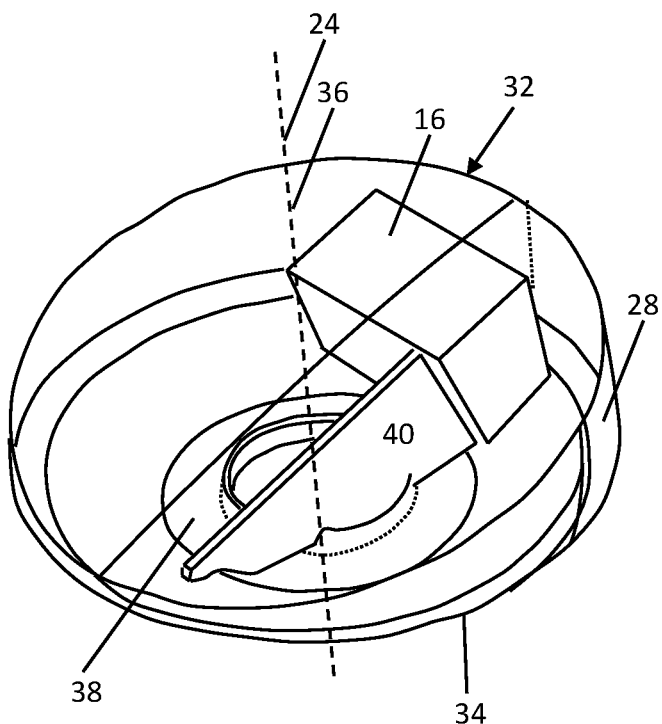
FIG. 5 is an embodiment of an environment sensor without a lid piece.
Figure 6:
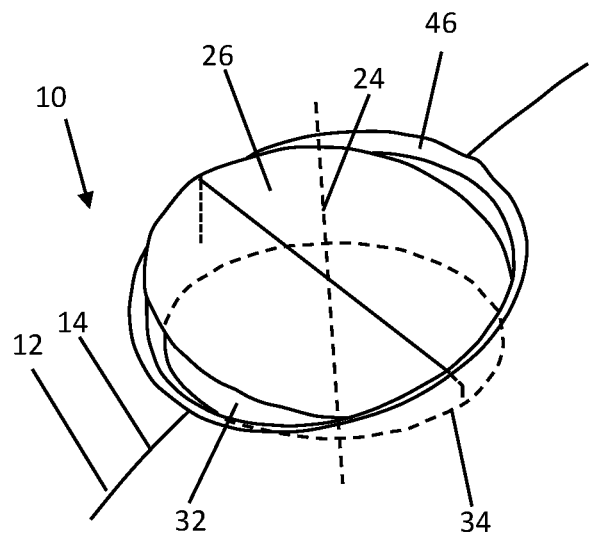
FIG. 6 is an embodiment of an environment sensor in a first operating position.

As can be seen from FIGS. 2, 3 and 5, environment sensor 16 including housing portion 32, which essentially has the shape of a part of a cylinder, can be rotated in opening 20 in this case. To this end, roof module 10 has a rotating device 38, for example, in the form of a rotary plate, which can be rotatably mounted on a bearing pin (not shown), for example. Environment sensor 16 and, if applicable, further electrical components can be disposed on rotating device 38 and, for example, be non-rotatably attached on rotating device 38 by means of a web-like holder 40. The rotational movement around rotation axis 24 is introduced by a drive 42 which can be an electric motor, for example. Drive 42 can be disposed directly on rotating device 38 or also be connected indirectly to rotating device 38 via a gear (not shown), for example. According to the invention, it is particularly simple to run a cable routing 44 based on the purely rotational movement of environment sensor 16 because said cable routing 44 can be run, for example, through the center of rotation of rotation axis 24, for example, through a recess in rotating device 38, as can be seen from FIG. 3.

Figure 7:
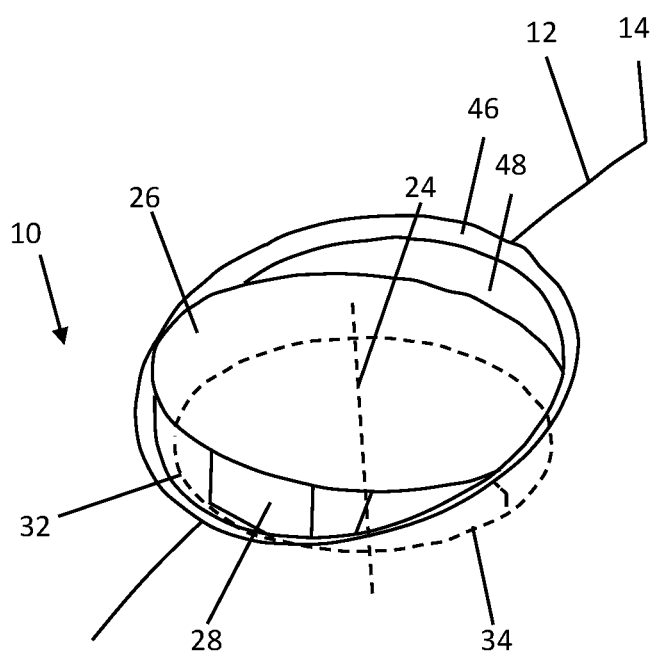
FIG. 7 is an embodiment of an environment sensor in a second operating position.

Furthermore, a weatherstrip 46, which is a tubular seal in the present case, is disposed circumferentially around opening 20, providing a seal between environment sensor 16 and roof skin 14, preferably irrespective of the position of environment sensor 16. At least in the resting position, weatherstrip 46 can ensure a complete seal, whereas in the at least one operating position, a secondary weatherstrip 48 is provided by means of which a wet area within opening 20 can be separated from a dry area within roof module 10 (see FIGS. 3 and 7).

See-through portion 28 can preferably also be cleaned by a cleaning device 50 (if necessary, with a wiping function). Cleaning device 50 can either be disposed on the inside of roof module 10, i.e., below panel component 12, for example, on a frame structure 52 of roof module 10. Alternatively or additionally, cleaning device 50 can also be disposed outside of roof module 10, for example, rigidly, on panel component 12 (see FIG. 3). Cleaning device 50 is configured to clean see-through portion 28 using a cleaning fluid which can be sprayed on see-through portion 28 from at least one cleaning nozzle of cleaning device 50 in the shape of a spraying cone. In FIG. 3, cleaning device 50 is disposed on panel component 12. In contrast, secondary weatherstrip 48, which is exemplarily disposed between panel component 12 and frame structure 52, protects the interior of roof module 10 from moisture entering and thus forms a dry area. In this case, environment sensor 16 and cable routing 44 are disposed together in a wet area of roof module 10 and are thus protected in a moisture-proof manner from moisture entering by means of a housing which comprises housing portion 32. The housing then forms an additional dry area.

The invention claimed is:

1. A roof module for forming a vehicle roof on a motor vehicle, the roof module having:
   a panel component which at least partially forms a roof skin of the vehicle roof, which functions as an outer sealing surface of the roof module and which has at least one curved area, and the roof module having at least one environment sensor which sends and/or receives electromagnetic signals for detecting a vehicle environment,
   wherein the environment sensor is disposed in a circular opening of the curved area of the panel component and is displaceable, essentially without tilt, between a resting position and at least one operating position by means of a rotational movement around a rotation axis, and
   wherein a weatherstrip is disposed circumferentially around the opening by means of which a seal is provided between the environment sensor and the roof skin, irrespective of the position of the environment sensor.

2. The roof module according to claim 1, wherein in the operating position, the environment sensor is configured to send and/or receive electromagnetic signals for detecting the vehicle environment around its optical axis, and that in the resting position at least one lid piece of a sensor module, in which the environment sensor is comprised, is disposed in the opening such that it closes the opening in an essentially flush manner.

3. The roof module according to claim 1, wherein in the at least one operating position, a see-through portion of the environment sensor protrudes over at least an edge of the circular opening.

4. The roof module according to claim 1, wherein the circular opening has an at least essentially oval shape.

5. The roof module according to claim 2, wherein the lid piece has at least an essentially oval, by means of which the opening is closable so as to fit essentially perfectly in the closed position.

6. The roof module according to claim 5, wherein the lid piece has a curved shape whose curved part extends in an essentially flush manner to the curved area of the panel component.

7. The roof module according to claim 1, wherein the environment sensor comprises an essentially cylindrical housing portion which is rotatably disposed in the opening.

8. The roof module according to claim 7, wherein the rotation axis is concentrically positioned to a central axis of the cylindrical housing portion.

9. The roof module according to claim 1, wherein the rotational movement is essentially carried out without leverage force.

10. The roof module according to claim 1, wherein the environment sensor is connected to at least one drive, the drive being configured to displace the environment sensor around the rotation axis between the resting position and at least the operating position.

11. The roof module according to claim 7, wherein the weatherstrip is disposed on an edge of the opening and abuts against the cylindrical housing portion by at least one sealing lip.

12. The roof module according to claim 7, wherein the essentially cylindrical housing portion is configured to perform a relative movement relative to the weatherstrip during a rotation in the opening by means of which the essentially cylindrical housing portion receives a mechanical cleaning.

13. The roof module according to claim 1, wherein the environment sensor is formed in the manner of a lidar sensor and/or in the manner of a radar sensor and/or in the manner of a camera sensor and/or in the manner of a multi-camera sensor.

14. A motor vehicle comprising a roof module according to claim 1.

15. The roof module according to claim 1, wherein the circular opening has an at least essentially elliptical shape.

16. The roof module according to claim 15, wherein the lid piece has at least an essentially elliptical shape, by means of which the opening is closable so as to fit essentially perfectly in the closed position.

17. The roof module according to claim 10, wherein the environment sensor is connected to at least one drive via a gear.

* * * * *